(12) United States Patent
Turner

(10) Patent No.: US 7,535,996 B2
(45) Date of Patent: *May 19, 2009

(54) METHOD AND SYSTEM FOR RECORDING AUDIO ONTO A CARRIER USING A PERSONAL COMPUTER

(75) Inventor: Gerry Turner, Los Alamitos, CA (US)

(73) Assignee: Voice Cards, Inc., Los Alamitos, CA (US)

( * ) Notice: Subject to any disclaimer, the term of this patent is extended or adjusted under 35 U.S.C. 154(b) by 561 days.

This patent is subject to a terminal disclaimer.

(21) Appl. No.: 11/091,256

(22) Filed: Mar. 28, 2005

(65) Prior Publication Data

US 2005/0163291 A1 Jul. 28, 2005

Related U.S. Application Data

(63) Continuation-in-part of application No. 10/680,310, filed on Oct. 7, 2003, now Pat. No. 7,203,287, which is a continuation of application No. 09/969,343, filed on Oct. 1, 2001, now Pat. No. 6,718,013.

(51) Int. Cl.
H04M 1/64 (2006.01)

(52) U.S. Cl. .............. 379/88.07; 379/88.17; 379/114.1; 704/275

(58) Field of Classification Search .............. 379/88.17, 379/88.22, 88.07, 114.1; 704/275
See application file for complete search history.

(56) References Cited

U.S. PATENT DOCUMENTS

| | | | |
|---|---|---|---|
| 4,791,741 A | 12/1988 | Kondo | |
| 5,045,327 A | 9/1991 | Tarlow et al. | |
| 5,063,698 A | 11/1991 | Johnson et al. | |
| 5,166,851 A | 11/1992 | Jacobson | |
| 5,387,108 A | 2/1995 | Crowell | |
| 5,425,078 A | 6/1995 | Stern | |
| 5,444,767 A | 8/1995 | Goetcheus et al. | |
| 5,490,206 A | 2/1996 | Stern | |
| 5,491,774 A | 2/1996 | Norris et al. | |
| 5,570,414 A | 10/1996 | Stern | |
| 5,577,918 A | 11/1996 | Crowell | |
| 5,588,678 A | 12/1996 | Young | |
| 5,719,920 A | 2/1998 | Harman | |

(Continued)

Primary Examiner—Gerald Gauthier
(74) Attorney, Agent, or Firm—Fulwider Patton LLP

(57) ABSTRACT

An audio message recording and playback system including a recorder-imprinter device, a self-contained voice module for playback of an audio message and a number of input devices for initially recording the audio message to the recorder-imprinter device. An internet web site is established for taking orders from customers, where customer data such as billing and shipping information is obtained. The web site further includes software that permits a user to create a voice recording to be delivered along with an accompanying product such as a greeting card, gift, flowers, or an ornament. The voice recording is accessed by a proprietor who confirms the billing and delivery information, and then transfers the voice recording to a recorder-imprinter that creates a transferable voice module for incorporation into the intended delivery. The voice recording can be made directly by the customer using a microphone and the software on the web site, or alternatively the voice recording can be created using a voice synthesizing program to create a voice message from text supplied by the customer via the web site.

14 Claims, 9 Drawing Sheets

U.S. PATENT DOCUMENTS

| | | |
|---|---|---|
| 5,761,836 A | 6/1998 | Dawson |
| 5,787,151 A | 7/1998 | Nakatsu et al. |
| 5,812,064 A | 9/1998 | Barbour |
| 5,826,235 A | 10/1998 | Harman |
| 5,828,732 A | 10/1998 | Gow |
| 5,841,878 A | 11/1998 | Arnold et al. |
| 5,860,065 A | 1/1999 | Hsu |
| 5,915,001 A * | 6/1999 | Uppaluru ................. 379/88.22 |
| 5,956,682 A | 9/1999 | Loudermilk et al. |
| 6,011,833 A | 1/2000 | West |
| 6,035,018 A | 3/2000 | Kaufman |
| 6,941,269 B1 * | 9/2005 | Cohen et al. ................. 704/275 |

\* cited by examiner

FIG. 11
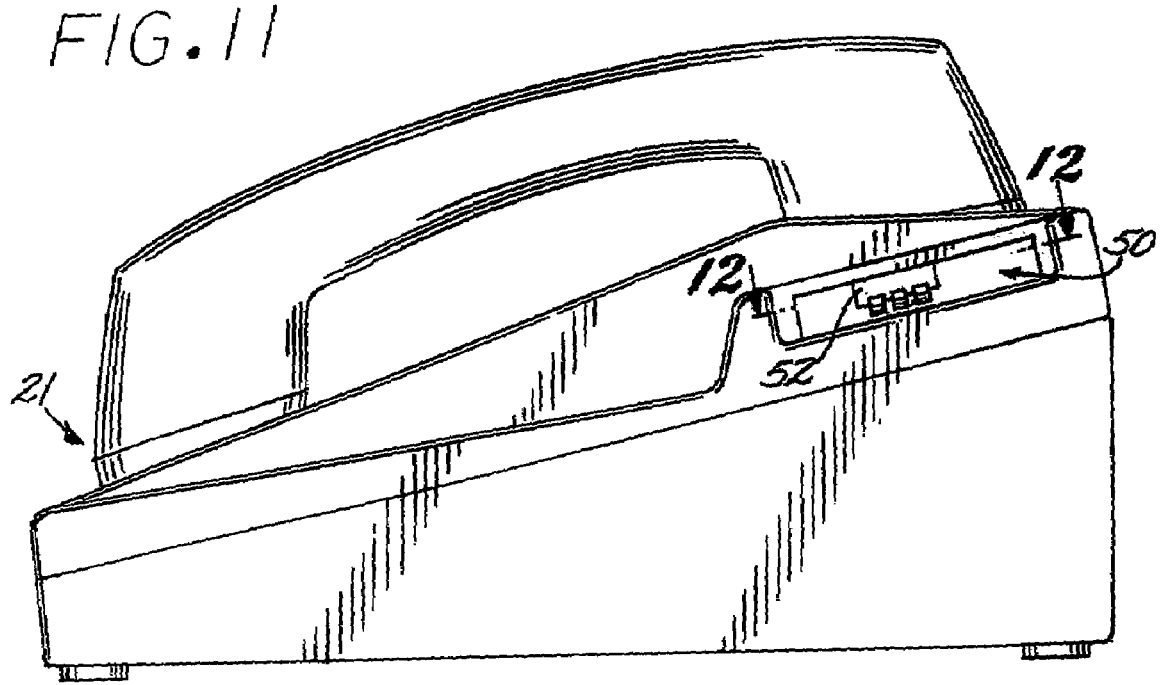
FIG. 12
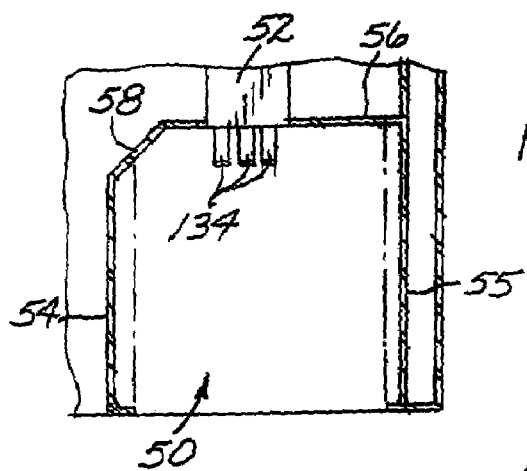
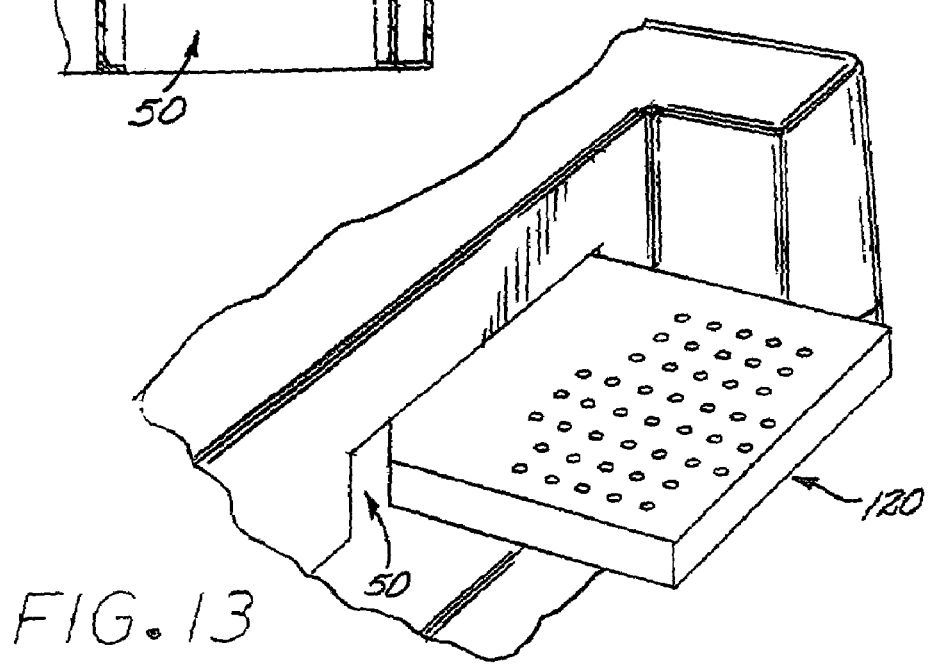
FIG. 13

METHOD AND SYSTEM FOR RECORDING AUDIO ONTO A CARRIER USING A PERSONAL COMPUTER

CROSS-REFERENCES TO RELATED APPLICATIONS

This application is a continuation-in-part of application Ser No. 10/680,310 filed Oct. 7, 2003, now U.S. Pat. No. 7,203,287 which is a continuation of application Ser. No. 09/969,343, filed Oct. 1, 2001, which issued as U.S. Pat. No. 6,718,013 on which this application claims priority under 35 U.S.C. § 120.

FIELD OF THE INVENTION

The present invention relates to recording and playback of personalized audio messages. More particularly, the present invention relates to the devices and methods employed in recording a personalized greeting onto a voice message playback module to be sent to a recipient along with a card, gift or other product.

BACKGROUND OF THE INVENTION

As modern conveniences have increased, so have the pace of life and the distances between loved ones, friends and business associates. People have become more transient, and a truly global marketplace has emerged. Due to the rapid technological advancements of recent years and the associated changes in how people conduct their personal and business affairs, the general public's interest in buying and obtaining products and information remotely has significantly increased commensurately. On a personal level, today many people often buy gifts through long distance telephonic retail services or over the internet. As a result, the gift giver may never see or touch the gift, which is typically sent directly from a warehouse or retail store to the intended recipient, much less be able to add a "personal touch" to the gift of any kind. In the business world, as well, it is often the case that products or information are sent to a customer directly from a third-party supplier without a truly personal touch from the sending party. For businesses to gain and keep customers in today's competitive marketplace, a personal touch may be the deciding factor. Therefore, in both the personal and the commercial context, it is often desirable to provide a custom, personalized voice message with a gift, product or other information being sent to a recipient.

To this end, several voice message recording systems have been contemplated in the art. For example, U.S. Pat. Nos. 5,719,920 and 5,826,235 disclose a system for remote recording of a personal audio greeting as compressed, digital data onto a "communication package." With this system, the greeting is stored in the programming device, or "unitized interface system," and then provided to the communication package as compressed, digital data; thereby necessitating that the circuitry of both the unitized interface system and the communication package contain components needed to transmit and store this compressed, digital data, causing the system to be relatively more complex, expensive and physically larger.

U.S. Pat. Nos. 5,425,078 and 5,490,206 disclose a method and system for recording an audio message onto a "keepsake" playback device through the use of a remote, computerized voice mailbox system. This system involves a programming device, or "subscriber set" that cannot itself store messages or be accessed directly. Rather, the vendor where the subscriber set is located must call the voice mailbox system to download the previously-recorded message directly to the keepsake. Thus, this system does not allow a customer on-site where the gift or card is located to conveniently record a personal greeting to a keepsake to be placed with the customer's purchase. Moreover, the customer cannot call into the subscriber set directly, but must always go through the voice messaging system and rely on the vendor to subsequently make the transfer to the keepsake. Therefore, the system disclosed by these patents is limited to only one means for a customer to record a personal voice greeting.

Finally, other examples of voice message recording systems known in the art include U.S. Pat. No. 5,063,698, which proposes that a customer's personal audio message be recorded from an answering machine onto a separate voice chip, or read-only memory device, that would then be inserted into a greeting card having the balance of the electronics for playback of the message pre-installed in the card, while U.S. Pat. No. 5,444,767 proposes that the entire voice message playback circuitry be pre-installed in a greeting card, ornament, stuffed animal, or the like. Thus, with these systems, all or a portion of the voice message playback circuitry is pre-installed in the card, gift or product being sent to a recipient, causing these systems to be bulky, inflexible and less adaptable to the needs of individuals and businesses alike.

SUMMARY OF THE INVENTION

The present invention provides for an economical, convenient and easy-to-use audio message recording and playback system. The system includes a recorder-imprinter device and a self-contained voice module for storage and playback of a personalized audio greeting that can be inserted into a variety of cards, ornaments or products.

The recorder-imprinter device of the present invention is a stand-alone machine configured with both a handset for on-site recording of a personal audio greeting and a conventional telephone jack and circuitry for interfacing with a telephone network so that a customer's call can be connected directly to the device and an audio greeting recorded remotely. In either case, the recorder-imprinter's microprocessor and pre-installed operational and voice prompting software guides the customer through the voice message recording process. When the audio message has been saved to the recorder-imprinter's solid state memory and the customer has replaced the handset or ended his call, the message remains stored in the recorder-imprinter until it is subsequently transferred to a voice module.

In an alternative embodiment, a personal computer is employed in the transfer of an audio message to or from the recorder-imprinter device via conventional e-mail or internet means. Software is provided for use in conjunction with this embodiment that is easily installed on the conventional personal computer and provides point-and-click operational modes for the recording, storage and downloading and uploading of audio message files. The personal computer may be located on-site with the recorder-imprinter or remotely, but in either case may be linked to the recorder-imprinter over a conventional computer network via a serial or USB connection. The audio message file downloaded from the computer is inherently digital and is stored in digital format in the RAM of the recorder-imprinter. In the case of inputs from the handset on the recorder-imprinter or a remote telephone call, the audio message is initially in analog format. Thus, the recorder-imprinter is equipped with an analog-to-digital converter so that the audio file may still be stored in digital format. Then, when the audio message is processed through the recorder-imprinter for transfer to the voice module, the file is converted to analog by a digital-to-analog converter before being sent to the voice module.

In yet another alternative embodiment of the present invention, an interactive web page is established for use in setting up customer information such as personal and billing data. The web page may also allow downloading of proprietary software that can be used by the customer on its own personal computer using a microphone to record a voice message for storage on the server hosting the web site. After the customer approves the recorded voice message, it is saved in an electronic file such as a .wav file and linked to the customer's personal and billing information. The customer's information and .wav file can be retrieved by a proprietor, who can verify the customer's billing information and then convert the .wav file if necessary to an alternative file format for use with a recorder-imprinter. If the proprietor is located at the recorder-imprinter, the voice module can be created at that point and incorporated into a card, gift, or ornament. If the proprietor is off-site, the voice file can be transferred electronically to a site with a recorder-imprinter (such as a florist shop, gift shop, or card shop) along with the delivery information after the billing information is verified.

In yet another alternative embodiment, the web site of the previous embodiment can be installed with voice synthesizing software that can read text from the customer and create a voice message from the inputted text. For example, if the customer did not have a microphone installed with the personal computer, the customer need only type the words of the intended voice message and the voice synthesizer software creates an audio message in a voice simulated tone that can represent the customer's message to the recipient. The client can then approve the synthesized message, and a file such as a .wav file containing the synthesized audio file can be forwarded to the proprietor as in the embodiment described above.

The voice module of the present invention consists of a single circuit board housed within a plastic casing so that its overall size is approximately 1.25".times.1.25".times.0.25". At the heart of the voice module's circuitry is a miniature solid state chip through which the other electrical components are wired so that the chip completely controls the module's operation. The voice module's power supply is in circuit with a switch and a timing device, both of which serve to reduce power draw while the voice module is idle. When the switch is actuated, audible playback of the audio message is effectuated through a speaker contained within the voice module. Ultimately, because of the voice module's small size, independent operation, electronic simplicity and low cost, it is optimally suited for use in a wide variety of cards, gifts and other products to be sent to an intended recipient.

In use, a personal greeting may be sent to a recipient employing the audio recording and playback system of the present invention in a few simple steps. A customer first records his or her greeting in the memory of a store's recorder-imprinter device by going to the store and using the device's handset, being connected to the device through a remote telephone call to the store, being transferred through a personal computer (either in the store or at another location), or by accessing a web site that accepts the customer's personal, billing, and delivery information and provides software for creating a voice message to be stored on the web site server and accessed by a proprietor for later conversion and possible transfer to a recorder-imprinter. Once the personal greeting is stored in the memory of the recorder-imprinter, a voice module is inserted into the programming port where electrical contacts removably engage an electrical receptacle in the port across which data can be exchanged. The voice module can only be fully inserted one way due to complementary indexing surfaces on the voice module and in the programming port. Immediately after the voice module is inserted in the programming port, the recorder-imprinter is put into programming mode by the operator and the desired greeting is selected from the recorder-imprinter's memory and recorded onto the voice module. When recording is completed, the voice module is removed and placed in a preformed pocket in the selected card, gift or other product being sent to the recipient. Thus, the audio recording and playback system of the present invention is flexible and convenient to use and produces a small, self-contained voice module for playback of a personal greeting accompanying a wide variety of personal and commercial items.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 11 is a right side view of the recorder-imprinter device of FIG. 1;

FIG. 12 is a horizontal sectional view, partially in section, taken along line 12-12 of FIG. 11;

FIG. 13 is a perspective view, in enlarged scale and partially in section, of the voice module of FIG. 8 partially inserted into the programming port of the recorder-imprinter device of FIG. 11;

DETAILED DESCRIPTION OF THE INVENTION

Figure 1:
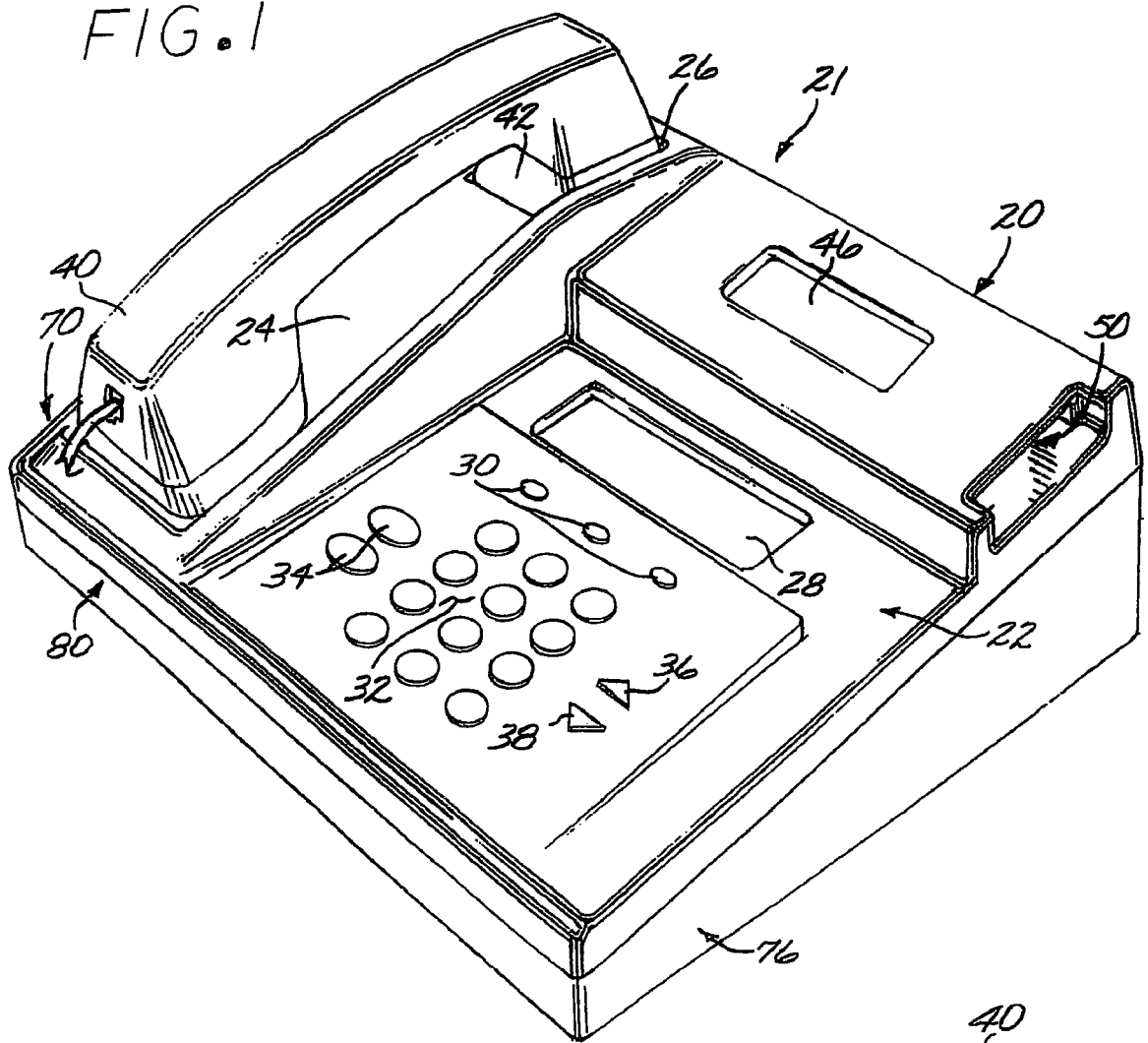
FIG. 1 is a perspective view of a recorder-imprinter device embodying the present invention.

As shown in the drawings for purpose of illustration, the present invention provides for an improved personal voice message recording and playback system that is generally comprised of a recorder-imprinter device 21 (FIG. 1) and a miniature voice module 120 (FIGS. 8 & 15) for portable storage and playback of a personal audio greeting.

The recorder-imprinter device 21 of the present invention functions to temporarily store personal audio greetings in its solid state analog memory for subsequent transfer to the permanent memory of the voice module 120, as will be discussed in detail below. The recorder-imprinter is optimally configured with a number of different input means for recording the personal audio greeting into the memory, making the device multi-functional and adaptable to the needs of all types of businesses.

Referring now to FIG. 1, the recorder-imprinter 21 is a stand-alone unit generally configured in size and shape much like the conventional combination telephone and answering machines known in the art. In this way, the recorder-imprinter is aesthetically-pleasing and small in size, so that the device can be easily and conveniently placed at a retail store's front counter, on a shelf or desk or other display, mounted on a wall, or at any other location where the device is usable and accessible to the store clerk and customers alike. The recorder-imprinter is housed in a housing 20 of molded plastic, such as polycarbonate, acrylic, polyethylene, or other such attractive, durable plastic known in the art. As a molded article, the housing is configured with graceful lines and rounded corners as well as the other functional features necessary to the recorder-imprinter's operation and may be made in a variety of colors to suit a particular business's decor or application.

The top wall 22 of the recorder-device housing is formed on its top side with a lengthwise, raised cradle 24 (FIG. 1) along its leftmost portion for complimentary receipt of a telephone handset 40. The cradle is configured at its upper extremity with a deeper recess 26 to accommodate the handset earpiece 42, the recess being further configured at its lower extremity with a hooked lip, as known in the art, for engaging a corresponding relief in the handset earpiece so as to secure the handset in the cradle when the recorder-imprinter is installed vertically, as on a wall. The central right portion of the top wall 22 is generally flat and configured with an arrangement of cut-outs, or windows, accommodating a visual display strip 28, three soft key function selection buttons 30 symmetrically spaced-apart and centered beneath the visual display strip, and a numeric keypad 32 centered below both the display strip and the selection buttons. The keypad also includes two operation-mode command buttons 34, an up-arrow button 36 and a down-arrow button 38.

With continued references to FIG. 1, the top right portion of the top wall 22 is raised to form a trans-wire rail which opens to the right to form a rectangular interface port 50 is for removable receipt of the voice module 120. The port is generally a rectangular recess configured in size and shape to accommodate insertion of the voice module. The interaction between the voice module and the recorder-imprinter through the port is described in more detail below. The upper surface of the rail is formed generally centrally with a recessed rectangular pocket 46 that may accommodate an advertising label or customer service contact information, such as a toll-free telephone number or web address.

Figure 2:
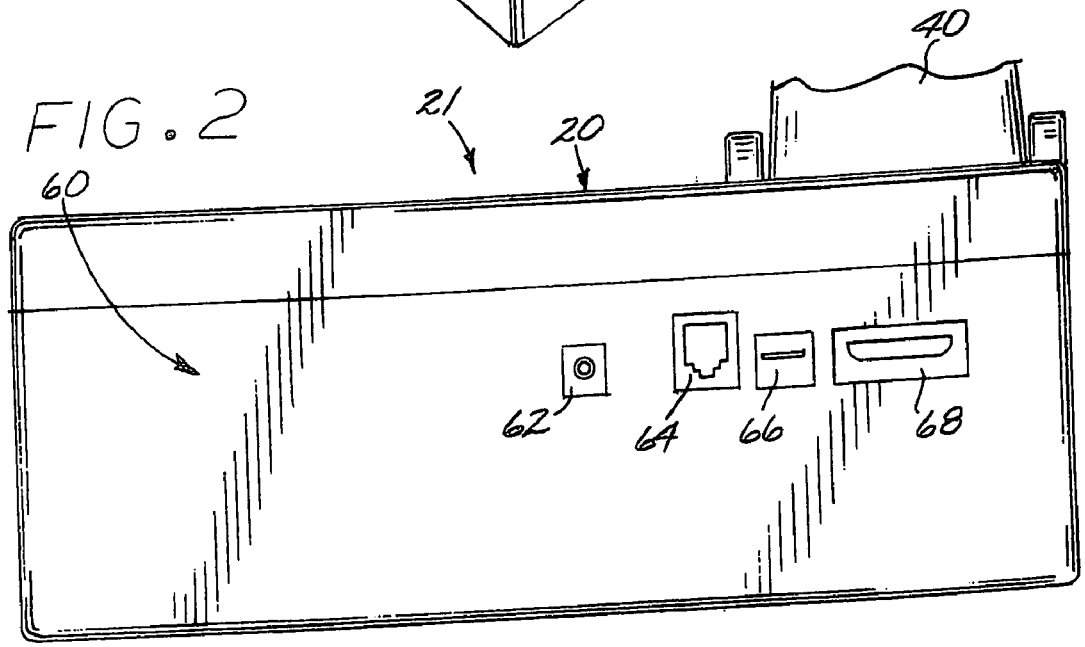
FIG. 2 is a back view, in enlarged scale, of the recorder-imprinter device of FIG. 1.
Figure 3:
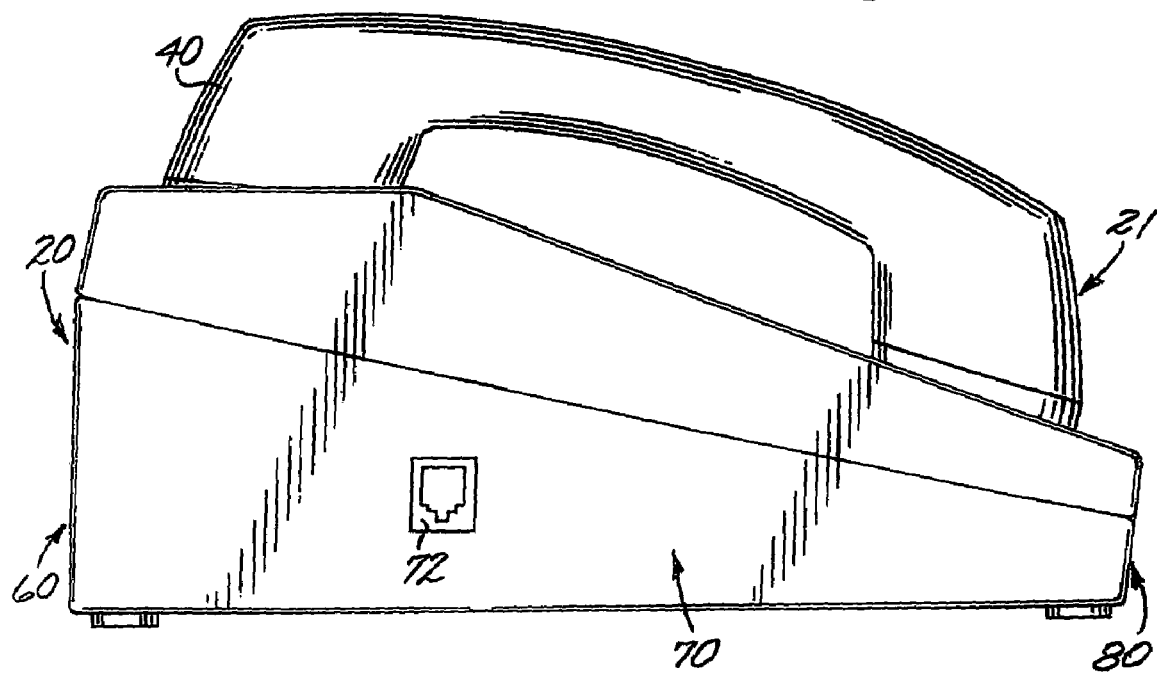
FIG. 3 is a left side view of the recorder-imprinter device of FIG. 2.
Figure 4:
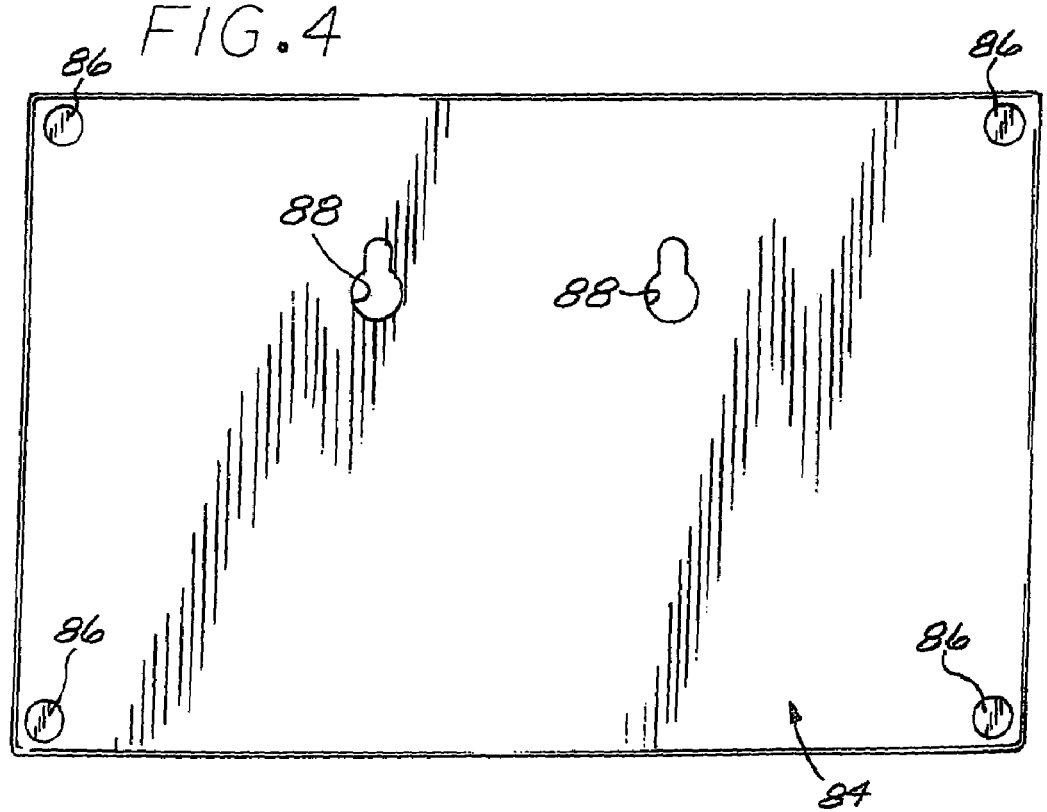
FIG. 4 is a bottom view, in reduced scale, of the recorder-imprinter device of FIG. 1.

With reference now to FIG. 2, the recorder-imprinter housing is formed with a back wall 60 configured with four sockets defining a power cord input connection 62, a first conventional telephone jack 64, a USB port 66 and a serial COM port 68, each being typical and known in the art. This first telephone jack 64 is provided for parallel connection of the recorder-imprinter 21 to the local telephone network using a conventional telephone cord with a "splitter" device, and a second telephone jack 72 (FIG. 3) is provided for connection to a conventional telephone cord to the handset 40 for use in on-site recording. The COM port and the USB port are provided for alternative connection means to a personal computer using a conventional serial cable or USB cable, as required, for the exchange of pre-recorded voice message files between the computer and the recorder-imprinter. The power cord input connection consists of a male pin configured to accommodate a female plug on one end of a power transformer cord. At the opposite end of the 12-volt DC power transformer plug is a conventional two- or three-pronged plug for insertion into the typical 110-volt wall electrical outlet.

Figure 5:
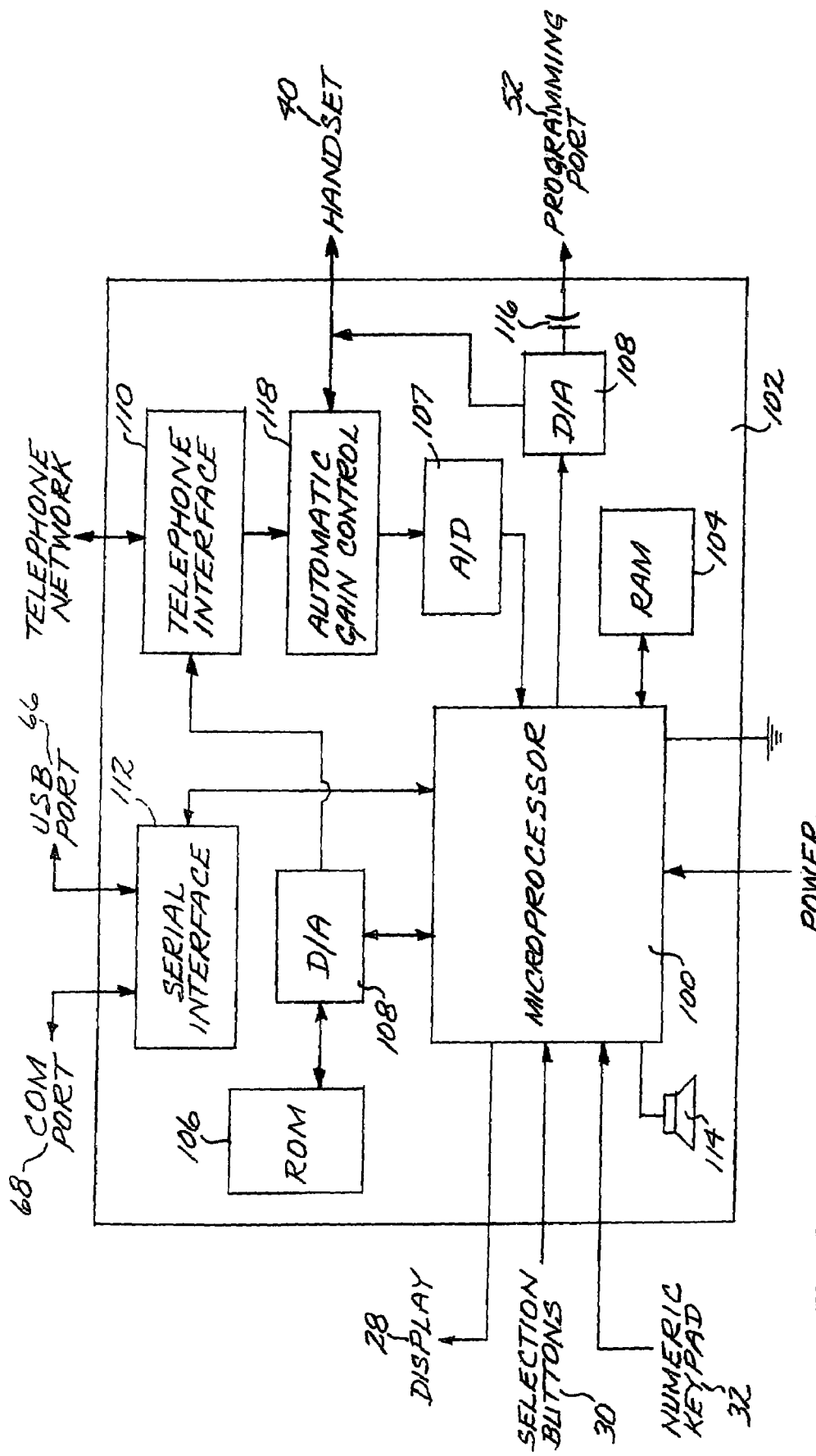
FIG. 5 is a block diagram of the primary electrical components included the recorder-imprinter device of FIG. 1.

With reference now to FIG. 5, internally, at the heart of the recorder-imprinter device 21 is a microprocessor 100 that directs all modes of the device's operation. The microprocessor is mounted on a conventional circuit board 102 as known in the art for safe and reliable electrical connection with the other components of the recorder-imprinter's circuitry. Two types of non-volatile memory devices are incorporated in the recorder-imprinter circuit. First, a solid state random access memory ("RAM") storage device 104 is provided for the temporary storage of data files representing a customer's voice message and order number. Second, a read only memory ("ROM") device 106 is provided for permanent storage of the recorder-imprinter's operating program and digitized voice prompt data. In the preferred embodiment, the RAM storage device 104 stores the data files in digital format, rather than analog, is provided in the recorder-imprinter's circuitry so that the data can be compressed, as is known in the art. In this case, the recorder-imprinter will necessarily include both an analog-to-digital ("A/D") converter 107 for conversion of incoming analog customer audio messages, as through the local handset or a remote telephone connection, and a digital-to-analog ("D/A") converter 108 for converting the digitized audio messages back to analog for storage in a voice module 120. Since the recorder-imprinter is capable of receiving voice data files from multiple sources, including transmission from a personal computer wherein the files are inherently digital, even if the RAM storage device is solid state (analog), a D/A converter will still be necessary to convert incoming digitized files to analog format for storage and subsequent transfer to a voice module. It is further noted that a D/A converter is required in the circuit anyway because the digitized voice prompts stored in the ROM device must be converted to analog for playback to the customer through the handset or over the telephone line.

With continued reference to FIG. 5, the recorder-imprinter 21 is also configured with a telephone interface circuit 110 for connection to a public switched telephone network and a serial interface circuit 112 for connecting to a personal computer through either the COM port 68 or USB port 66. The interface circuits are electrically connected on the recorder-imprinter's circuit board 102 across the appropriate pins of the microprocessor 100. The recorder-imprinter's circuitry further includes connections to the display device 28, which can be an LCD or vacuum fluorescent display, the soft key selection buttons 30, the numeric keypad 32, and an audible "help" indicator 114, which is a small speaker.

Finally, the circuitry of the recorder-imprinter 21 includes the interface port 50 (FIG. 13) mentioned above and which, again, will be described in more detail below as it relates to the operation of the recorder-imprinter in transferring a voice message to a voice module 120. At this juncture, though, it is important to note that the multi-contact female electrical receptacle 52 within the interface port is wired to the recorder-imprinter circuit and across the appropriate pins of the microprocessor 100 so that power and data can be shared across the contacts with the voice module. Moreover, secondary electrical components necessary for data transmission and analog filtering, such as a 0.1 .mu.F capacitor 116 (FIG. 5), are shared by the voice module across one of the receptacle's contacts so as to minimize the number of components in the voice module itself, again contributing to the goal of the present invention of making the overall system, and in this case the voice module particularly, smaller, less complex and more reliable. Relatedly, the recorder-imprinter circuitry is designed to prevent overloading the microprocessor and to minimize background noise distortion by incorporating an automatic gain control circuit 118 (FIG. 5). With each of the recorder-imprinter's electrical components connected in circuit and operating through the central microprocessor, the microprocessor is operable to control the flow of data in and out of the recorder-imprinter through the various interface devices.

Figure 6:
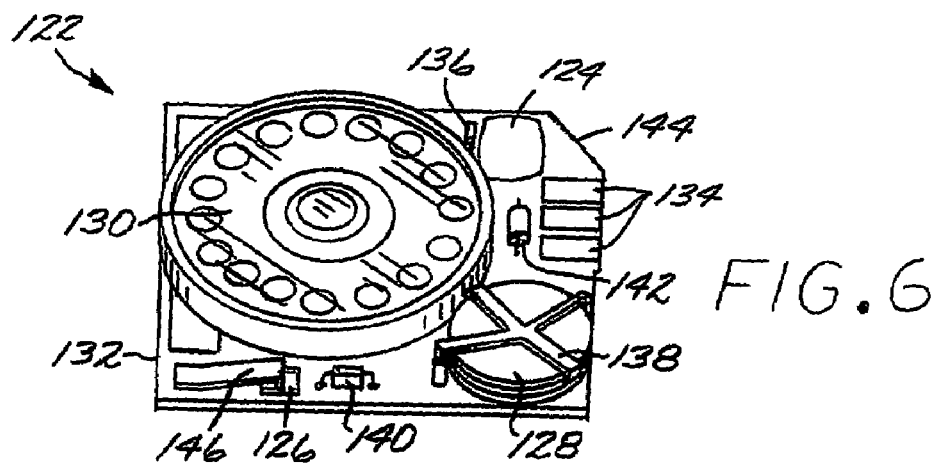
FIG. 6 is perspective view of a voice module circuit board included in a voice module utilized with the device shown in FIG. 1 but in enlarged scale.
Figure 7:
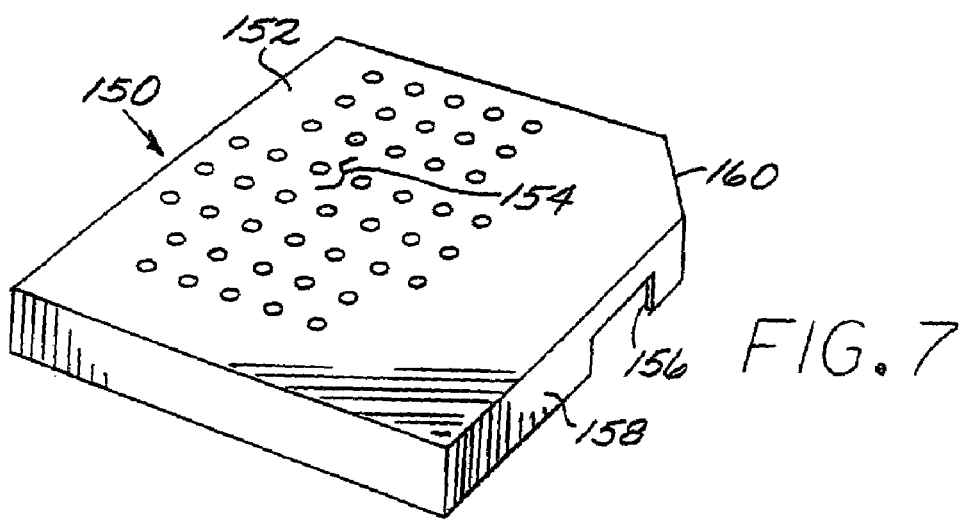
FIG. 7 is a perspective view of a cap employed in encasing the board shown in FIG. 6.
Figure 8:
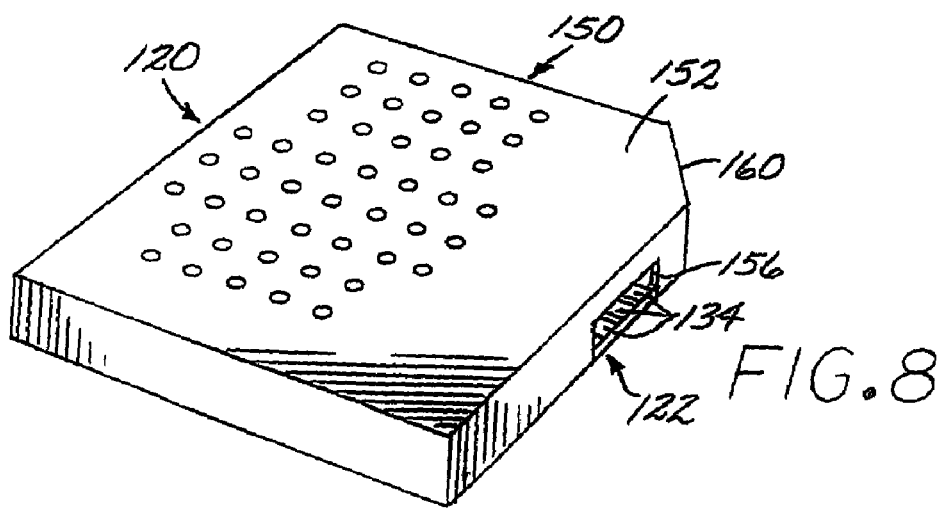
FIG. 8 is a perspective view of the voice module cap shown in FIG. 7 installed on the board shown in FIG. 6.

Referring now to FIGS. 6-8, the voice module 120 of the present invention is a self-contained electronic device for storing and audibly playing back a voice message provided by the sender and recorded onto the voice module through the recorder-imprinter interface port 50. The circuitry 122 of the voice module includes a programmable chip 124 (or controller), a switch 126, a power supply 128 and a speaker 130. Just as for the recorder-imprinter 21, the chip is the heart of the voice module electronics and controls its operation. The chip preferably employed in the voice module incorporates an analog RAM storage device that is non-volatile, or permanently stores the voice message transferred to the voice module. One such chip that may be employed is an ISD-1420 solid state chip manufactured by Information Storage Devices Corporation in Sunnyvale, Calif. The chip and the other voice module components are mounted on a single circuit board 132 and are electrically connected in circuit using techniques of prefabrication and soldering known in the art. Thus, the chip is in circuit with the power supply, switch and speaker to control the playback of a previously recorded voice message stored in the chip's solid state memory. In order to record a voice message into the memory of the voice module, the circuit is equipped with several contact plates 134 configured to electrically interface with several contact surfaces 52 (FIG. 12) of the recorder-imprinter's interface port 50 (FIGS. 1 & 11) when the voice module is nested in the port. The details of this recording process are described below.

With continued reference to FIG. 6, the voice module circuitry 122 includes a power supply 128 which may be DC batteries or other such power source known in the art. In one embodiment, the power supply consists of four DC batteries in series (stacked). The batteries are held in position and positive and negative electrical contact made across them through the use of a beryllium copper battery clip 138. Aside from the switch 126 being in circuit between the power supply and the chip 124 in order to conserve power when the voice module is not in use, the circuitry is also equipped with a timing device 136, connected between the power supply and the chip in order, when the circuit is open, to regulate power draw while the voice module is idle, particularly after the voice module memory has received a voice message and is still connected to the recorder-imprinter 21 through the interface port 50. The timing device thus works in concert with the switch to maximize the life of the power supply. Finally, the voice module circuitry includes film or carbon resistors: resistor 140 in circuit between the switch and the chip and resistor 142 in circuit between a contact plate 134 and both the switch and the chip.

Referring now to FIG. 7, a plastic casing 150 is provided to house the voice module circuitry 122, thereby protecting both the components and the user and making the finished voice module 120 more attractive and functional. The plastic casing may be molded from a variety of suitable materials, including polyethylene, polypropylene or K-Resin, and in a variety of colors. The casing is essentially a lid for the circuit board having a top 152 and four sides. In a preferred embodiment, the circuit board 132 and casing are generally square, with the overall outside dimensions of the casing being approximately 1.25".times.1.25". The inside dimensions of the casing correspond to the outside dimensions of the voice module circuit board so that when the circuit board is seated within the casing such that its bottom surface is flush with the bottom edge of the casing's sides, it is secured in place through an interference or snap fit between the perimeter edges of the board and the inside surfaces of the casing sides. During assembly, the circuit board may be further secured within the casing by applying an adhesive along the contacting surfaces. As assembled, the thickness of the voice module is approximately 0.25".

The voice module casing 150 is formed on its top 152 with a pattern of small holes 154, each on the order of 0.05". This hole pattern is positioned in the top surface such that when the circuit board 132 is installed within the casing, the speaker 130 is located immediately beneath and adjacent the hole pattern for communication of sound. Thus, sound from the speaker 130 is communicated through such holes to be propagated to the recipient of a gift product housing the module to thereby optimize the acoustical quality and the listener's enjoyment of the personal audio greeting. Referring to FIGS. 7, 8 and 12, the casing is further formed on one side 158 with a small rectangular cut-out 156 for receipt of respective electrical prongs 134 (FIG. 12) projecting into the interface port 50 for electrical engagement thereof.

With continued reference to FIGS. 6-8, one single corner of the voice module casing is formed with a 45 degree chamfer at to create a diagonal indexing wall 160. Viewing the assembled voice module 120 from above, or looking down on the casing's top surface 152, as shown in FIG. 8, the diagonal wall is formed in the corner counter-clockwise from the rectangular cut-out 156. As shown in FIG. 6, the corner of the circuit board 132 counter-clockwise from the contact plates 134, as viewed from above, is cut to create a diagonal edge 144 that corresponds to the inside surface of the diagonal wall 160 of the casing to facilitate installation of the circuit board within the casing. As will be described in more detail below, in use, the diagonal wall serves to help orient the voice module when it is inserted into the interface port 50 of the recorder-imprinter 10. It will also be appreciated that the diagonal wall serves to orient the casing on the circuit board, so as to properly position the speaker 130 beneath the hole pattern 154.

Playback of the voice message stored in the memory of the voice module chip 124 is initiated when voice module switch 126 is closed to complete the power circuit and allow current to flow from the power supply 128 to the chip, thereby starting the voice message playback cycle. The switch is simply a leaf-spring-type contact, or the like, that, when depressed, closes the circuit. In order for the user to close the switch, which is internal and inaccessible when the casing 150 is installed over the voice module circuit board 122, a manual actuator 146 is installed in mechanical relationship with the switch itself. The manual actuator is preferably a molded piece of silicone rubber, or other non-flammable composite material, configured such that when the actuator is installed on top of the switch and the casing is installed on the circuit board, the actuator is flush with the inside surface of the casing's top 152 so as to create a mechanical linkage between the switch and the casing's top. It will be appreciated by those skilled in the art, then, that a downward force applied to the outside of the casing at a marked location corresponding to the internal position of the actuator will be transmitted by the actuator to the switch in order to begin playback. Thus, the orientation of the casing on the circuit board is also important in aligning the manual actuator with the corresponding marked depression area 211 (FIG. 15) on the casing's top surface so that a user can reliably and easily initiate playback.

Audible playback of the stored voice message is effectuated through the speaker 130 connected in circuit with the chip 124. At full power, the speaker is capable of delivering audible sounds of up to 80 db without additional amplification. An amplifier may be provided within the voice module circuit to further increase the volume of the audible output. The cooperation of the speaker's improved audible output and the hole pattern 154 above the speaker for free passage of the sound waves from the speaker to the listener help to insure clear and loud playback of the personal audio greeting stored in the voice module 120.

In the preferred embodiment, then, the voice module 120 of the present invention stores and plays back voice messages by employing a small and streamlined circuit, including a miniature solid state chip 130 that controls the operation of the voice module.

The present invention also provides a personal voice message recording and playback system that is flexible and adaptable to many business needs by allowing for numerous means to store a voice message in the recorder-imprinter device 21 for subsequent transfer to the voice module 120. In a first embodiment, a recorder-imprinter device is located in a retail store, such as a flower or gift shop. Such recorder-imprinter is relatively low in cost and small in size because of its streamlined electronics and use of well-established technologies, making it practical for most any retail store owner to procure the voice message system of the present invention and incorporate the system in his or her businesses. Furthermore, since the recorder-imprinter is essentially a stand-alone device and does not require any additional hardware or software installation to use, it is all the more cost-efficient and is easy to set up and put into everyday use for the small business owner and large distributor alike.

Figure 9:
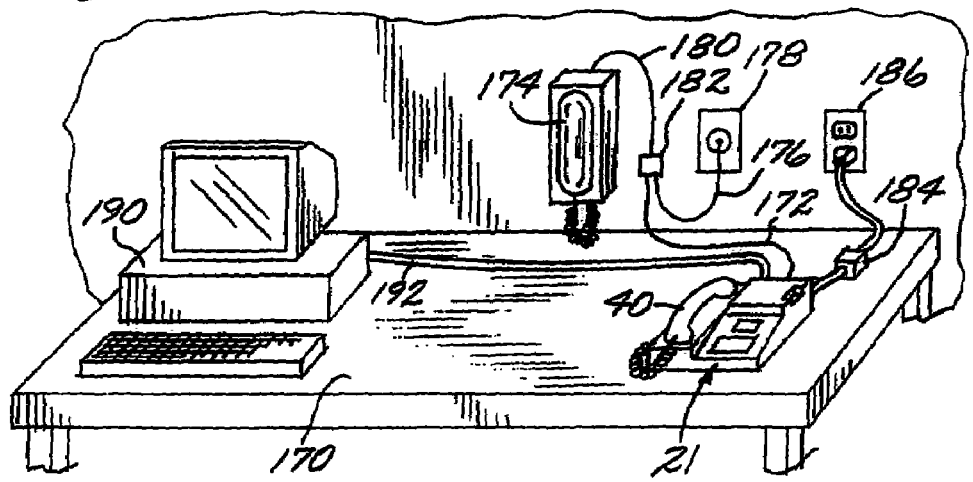
FIG. 9 is a perspective view in a reduced scale of an audio message recording system in circuit with the recorder-imprinter shown in FIG. 1.

Referring now to FIG. 9, to set up and configure the recorder-imprinter device 21 of the present invention for immediate use, only a few simple steps must be taken. Once a location for the recorder-imprinter has been selected and the device is in position, for example, on a counter 170, a long telephone cord 172 packaged with the device is plugged into the telephone jack 64 (FIG. 2) on the back of the device and the other end of the cord is run to a nearby store telephone 174. The incoming line 176 that connects the existing store telephone to a wall telephone jack 178, which is part of a conventional telephone network, is then briefly unplugged and, in place of the incoming line, a short telephone cord 180, also provided with the recorder-imprinter, is plugged into the telephone. At the free end of the short telephone cord a splitter device 182 that is also provided is plugged in. Then, the incoming line that was moments earlier unplugged from the telephone is plugged into one side of the splitter device and the free end of the long telephone cord running from the recorder-imprinter is plugged into the other side of the splitter device. The existing store telephone is again on-line and should have a dial tone when the handset is picked up. The handset 40 is then plugged into the telephone jack 72 (FIG. 3) on the side of the device and power supply transformer 184 plugged into the power cord input connection 62 (FIG. 2) at the back of the device to connect to a 110-volt wall plug 186.

Once power is supplied to the recorder-imprinter device, it will automatically assume its "ready" mode available for immediate use.

In use, when a customer calls the shop to order a gift, or perhaps flowers in the case of a flower shop, to be sent to a recipient, the order information will be taken down and the shop clerk will offer the additional service of sending with the flowers a personalized voice message greeting card incorporating the voice module 120 (FIG. 8) of the present invention. If the customer accepts, the clerk will then provide the customer with some general instructions and transfer the call to the recorder-imprinter 21 by pressing the appropriate selection button 30 (FIG. 1) under the word "PHONE" on the recorder-imprinter's display 28 (FIG. 1). The recorder-imprinter will prompt the shop clerk to enter the customer order number and then prompt the customer through the voice message recording process. The prompts provided by the recorder-imprinter are audible and are transmitted in analog format through the telephone line 172 hooked up to the device and then through the splitter device 182 and incoming line 176 across the telephone network to the remote customer. The operational program will provide the prompting and control the entire recording process from the pre-installed ROM memory device 106 (FIG. 5) to control the microprocessor 100 (FIG. 5). Once the customer has completed recording, the message is automatically played back, and the customer then has the opportunity to accept, re-record, or call the clerk for help. In the latter case, an audible prompt 114 (FIG. 5) notifies the clerk that there is some problem, and the clerk can retake the customer's call by simply pushing the selection button under the word "OK" on the display and picking up the handset of the store telephone 174 to speak with the customer.

Once the customer successfully completes recording, the recorder-imprinter 21 automatically hangs up to release the telephone line. The customer's unique personal greeting will then remain in the RAM device 104 (FIG. 5) of the recorder-imprinter associated with the customer's order number until the message is saved to a voice module 120 (FIG. 8) and subsequently deleted. Only recording of a new voice message under the same customer order number will overwrite the stored voice message file. The memory of the recorder-imprinter is designed to store up to a fixed number of voice messages (50, 100, etc.), depending on how the RAM device is configured. Moreover, as discussed in more detail below, when the recorder-imprinter is connected to a personal computer 190 (FIG. 9) running the voice message system software, files representing the voice messages and customer order numbers stored in the memory of the recorder-imprinter may be uploaded to the computer for transfer to another remote PC or recorder-imprinter or for long-term storage, as for archiving purposes.

Figure 10:
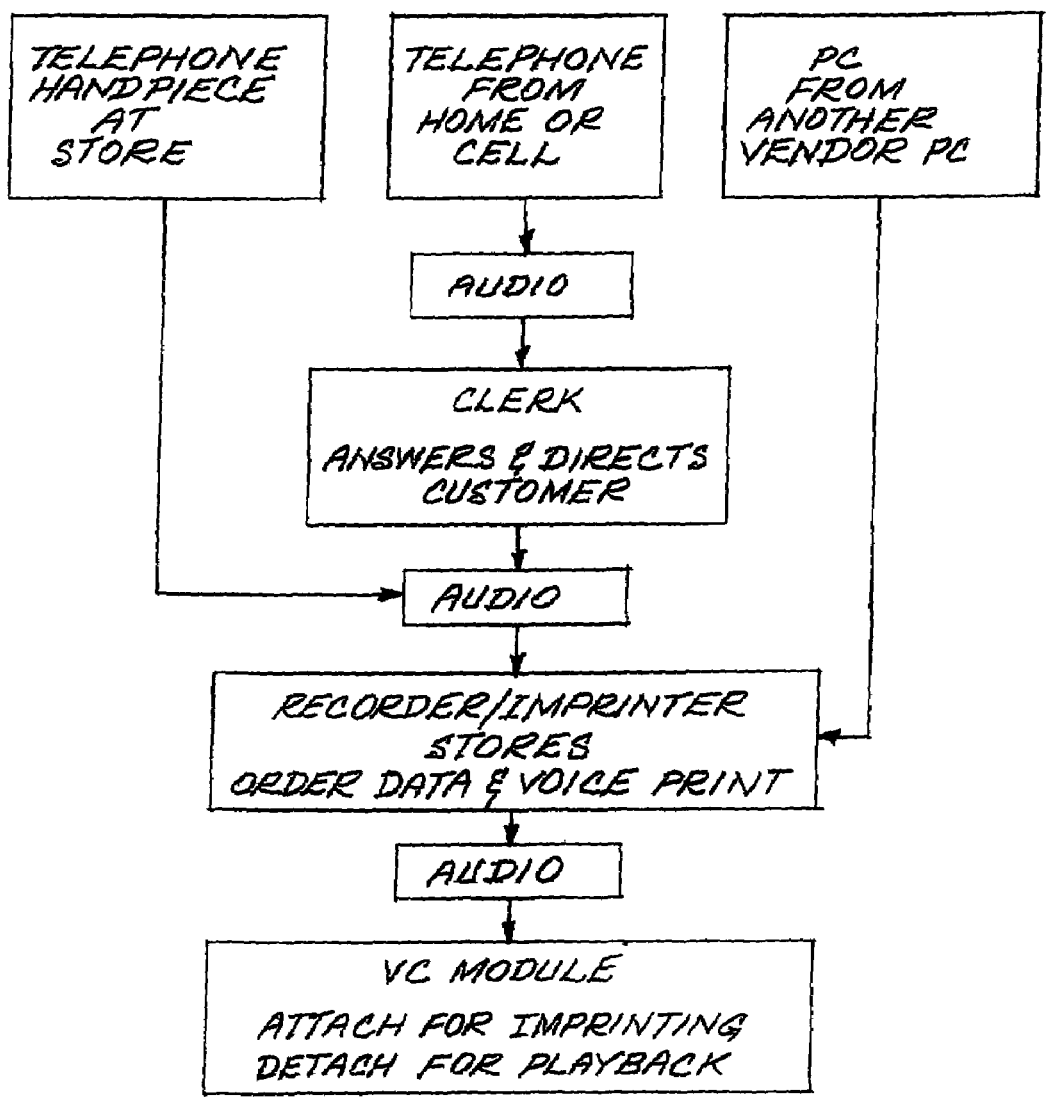
FIG. 10 is a schematic showing the steps of recording an audio message to the recorder-imprinter device of FIG. 1 and subsequently to the voice module of FIG. 8.

Similar to the recording of a voice message from a customer at a remote location, a second embodiment of the present invention involves the situation in which a customer in a store or office desires to send a voice module 120 having a personalized audio greeting along with his or her purchase. In this case, the customer may simply lift the handset 40 of the recorder-imprinter 21 and follow the prompts from the device as above. The customer order number can be selected by the customer (sender) or provided by the operator helping the customer with the purchase. For convenience during in-store or in-office recording, the recorder-imprinter's display 28 (FIG. 1) indicates the number of seconds remaining for the recording and instructs the customer to press the selection button 30 under the word "SAVE" on the display should they complete recording before the allotted time is up. Typically, the customer's voice message may be up to 20 seconds. A flow diagram representing the basic processes of a customer interfacing with the recorder-imprinter through a remote telephone connection or through the recorder-imprinter's handset, as well as through a personal computer, which is discussed in detail below, is shown in FIG. 10.

With reference again to FIG. 9, a third embodiment of the voice message recording and playback system of the present invention for storing a voice message in the recorder-imprinter 21 entails the use of a personal computer 190 in the local or remote recording of an audio message. To prepare the recorder-imprinter for use in this context, the computer or computer network is simply connected to the recorder-imprinter device by plugging a cable 192 into the serial port 68 or the USB port 66 (FIG. 2) on the back of the device, depending on the configuration of the personal computing system with which the device will be interacting.

In accordance with the present invention, software has been developed to run on the Windows platform of the typical personal computer in order to support the interaction of the computer 190 with the recorder-imprinter device 21. This software, or driver, allows the personal computer to recognize and store voice message files and provides for a number of file utility functions, including transferring to and from the recorder-imprinter. The transfer of voice message files is facilitated by the software's interaction with conventional computer network systems and software, such as e-mail and local area networks. The software is typically packaged with the voice message recording and playback system and is installed by the user on the computer's hard drive in the conventional manner from either a 3½" floppy diskette or a CD-ROM provided with the recorder-imprinter system.

Once the software has been installed on the personal computer 190 and has been run from the "Start" menu or by double-clicking on the software's "Desktop" icon, a home screen appears that provides several point-and-click options. One option allows the user to operate the recorder-imprinter remotely, while another option would allow the user to create a voice file using the computer's own hardware; i.e., the computer's keyboard, microphone and sound card. The software provides audio and/or text prompts to guide the user through the entry and recording of information, including the personal greeting itself. Another option provided by the software allows the user to view all voice message files by order number that are currently stored in the computer. A fourth option provided is to then open one or more of the voice message files and send selected files to a recorder-imprinter 21 over a conventional computer network utilizing the serial or USB cable 192 installed at the back of the recorder-imprinter. Thus, a customer can interact with a personal computer at the same location as the recorder-imprinter to actually create a unique voice message or to download a previously recorded message.

In use with the personal computing embodiment of the present invention, a customer might call in to a larger operation such as a catalog distributor or a department store to place a gift order. After placing the order, the customer is asked if he or she would like to send a personalized voice message greeting card with their order. If the customer responds affirmatively, the operator will then transfer the call to an on-site personal computer that is running the voice message software, as through a local network or a modem connection. Once the customer's call has been connected to the computer, as discussed above, the software will then take over and prompt the customer through the voice message recording process. As with on-site recording, the customer enters his or her unique order number as provided by the operator, which links the voice message to the purchase. After the message has been successfully recorded and stored in the computer's memory, at some point later, a clerk or operator at the personal computer would initiate the download of the customer's voice message file to the appropriate recorder-imprinter using the software on the personal computer. With the recorder-imprinter device properly connected to the computer system through either the serial or USB port, the file transfer can take place without the involvement of the clerk at the distribution center where the recorder-imprinter is located, unlike the telephone interface discussed above. Information about the gift order and which order corresponds to which customer order number and voice message may be communicated to the remote location via any of several means of communication, including e-mail, fax and telephone.

A fourth embodiment of the present invention wherein a voice message may be stored in the memory of a recorder-imprinter device 21 involves the exchange of this information between two such devices. Thus, a sender's voice message file that has been recorded and stored in a recorder-imprinter at a first location, as when a customer walks into a store or calls a store and desires to send a personalized voice module with a gift purchase, may be transferred to a recorder-imprinter at a second location where the voice message will then be transferred to a voice module to accompany the gift or card being sent to a recipient. This embodiment is particularly well-suited for the situation in which a customer is at or has called one location of a store chain and desires to purchase and send a gift that is out of stock at that store but is in stock at another store. In this case, if both the store where the customer is located and the store where the gift is located have a recorder-imprinter, the customer can record his personal voice message locally in the store where he is and then have a clerk transfer the recorded message to the recorder-imprinter at the store where the gift is in stock. To facilitate the transfer of the file to the second, remote recorder-imprinter, the clerk will simply notify the other store and ask the clerk at that store to configure the remote recorder-imprinter for the transfer. In the alternative, the transfer between store locations can be facilitated through a personal computer as described above. Or, in the case where a sender has called a first store, the clerk can transfer the phone call to the second store where a clerk there could connect the sender to a recorder-imprinter at that location for the sender to record a personal greeting to accompany his or her purchase.

In any of the above embodiments, ultimately, the customer's order number and voice message is stored as a voice message file in the RAM device 104 (FIG. 5) of the recorder-imprinter 21 at the location where the customer's voice message is to be recorded onto a voice module 120 to accompany a gift, card or other product delivered to a recipient. At any point after the file is so stored, a clerk or other operator, or the customer if he or she is recording on-site, may download any such previously-recorded voice message onto a voice module using the recorder-imprinter.

Referring now to FIGS. 11-13, the user may initiate this process by inserting a blank voice module into the interface port 50, causing the device to be automatically shifted into programming mode. Transfer of the voice message from the recorder-imprinter is achieved because the contact prongs of the female electrical receptacle 52 within the interface port are connected to the recorder-imprinter circuit and across the appropriate pins of the microprocessor 100 so that power and data can be shared across the contacts with the voice module, and the recorder-imprinter can thereby detect the voice module's insertion into the interface port. The interface port is further configured with side walls 54 and 55, an end wall 56 and a diagonal wall 58, or first indexer, between the end wall and the left side wall 54 so as to only complement the profile of the voice module when it is inserted in one way. Thus, as mentioned earlier, the configuration of the voice module, and particularly the diagonal wall 160 (FIGS. 7 & 8), or second indexer, of the voice module's casing 150, serves to orient and align the voice module in the interface port to insure proper mating and electrical contact between the port's female contact receptacle and the contact plates 134 of the voice module 120.

After inserting the voice module 120 into the interface port 50, the recorder-imprinter 21 will shift into its programming mode so that the user may scroll through the files currently stored in the RAM device 104 of the recorder-imprinter 21 using the up and down arrow buttons 36 and 38 on the numerical keypad 32 (FIG. 1). When the desired file is located, the user may press the selection button 30 under "PROG" on the display 28 to begin the transfer to the voice module. While the transfer is taking place, the recorder-imprinter will display a message indicating such. When the transfer is complete, the user will be prompted to remove the voice module from the recorder-imprinter by an appropriate message on the display 28.

Figure 14:
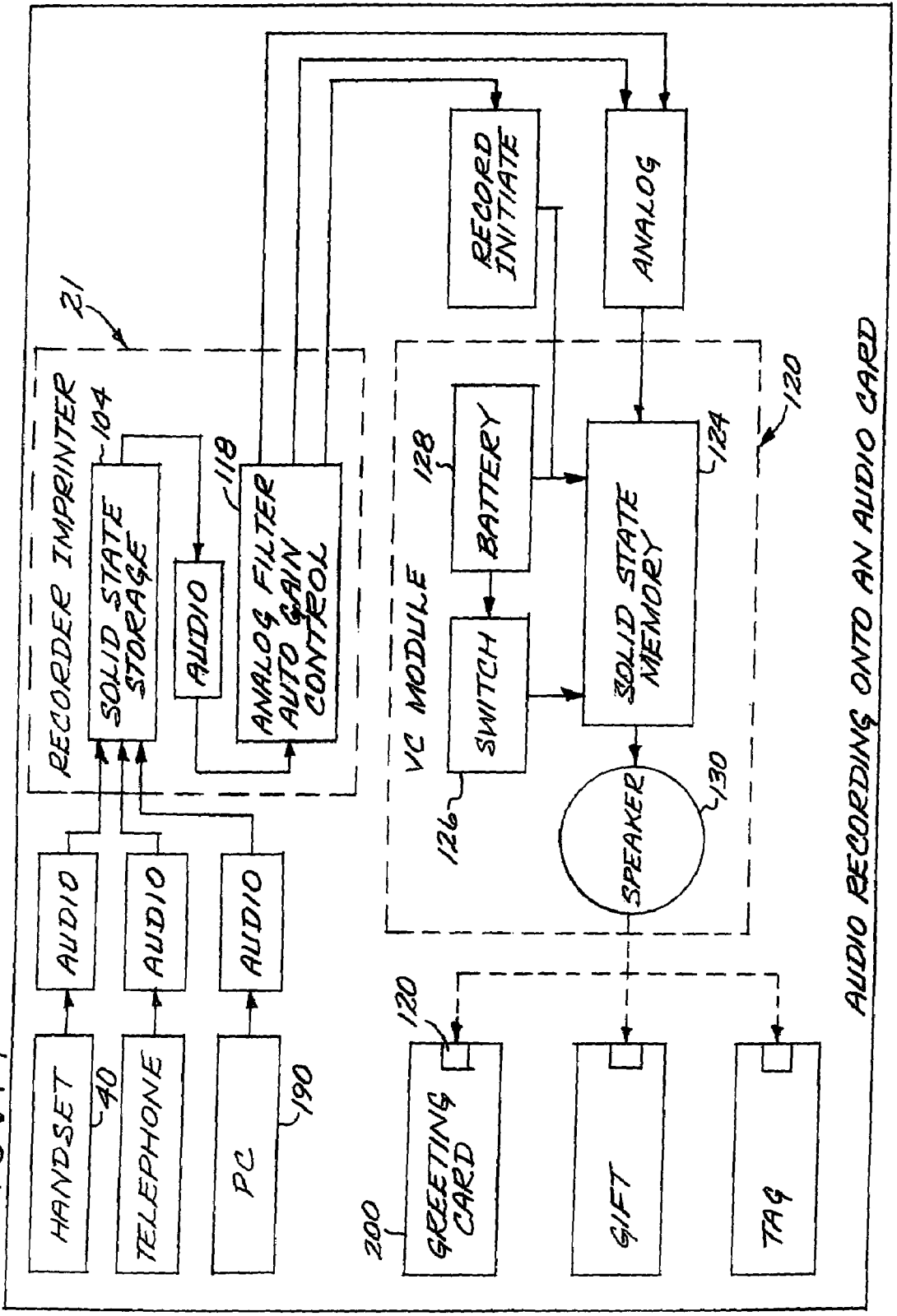
FIG. 14 is a schematic diagram depicting the steps for of electronically programming the voice module of FIG. 8 with an audio message.

Referring to the schematic shown in FIG. 14 depicting the overall flow of the audio greeting from the input device (remote telephone, handset or personal computer) through the primary components of the recorder-imprinter and into the solid state memory of the voice module 120, it will be appreciated that the personal voice message remains in analog format throughout the transfer and storage process to the voice module.

Figure 15:
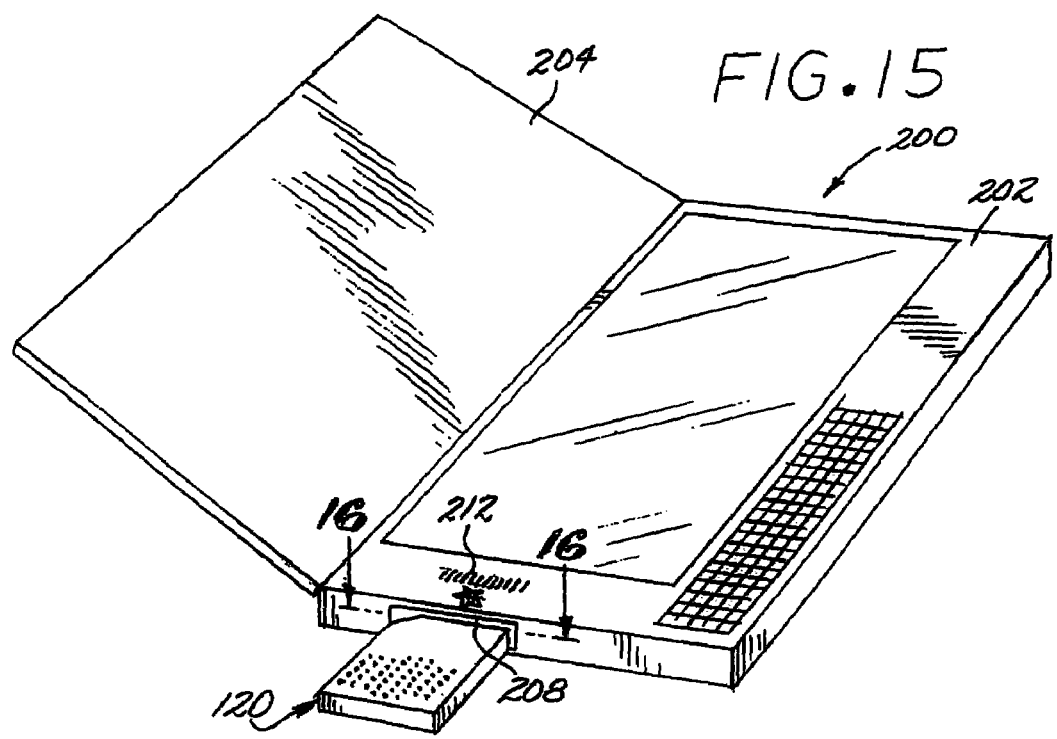
FIG. 15 is a perspective view in reduced scale showing the voice module of FIG. 8 being inserted in a greeting card.

The last step in the process of recording and sending a personal audio greeting according to the present invention, as shown in FIG. 14, is for the user to remove the recorded voice module 120 from the recorder-imprinter 21 and place it with the card, gift or other product being sent to the recipient. Referring to FIG. 15, a greeting card 200 embodying the present invention and exemplary of the type of greeting card that may be sent to a recipient along with a voice module generally includes a back 202 and a front flap 204. The back is approximately ¼" thick and consists of a lightweight foam or fiber core 206 with a finished, tighter-weave paper stock bonded to the outwardly-facing or otherwise exposed surfaces of the core. In this way, the card is still relatively light while retaining the functional integrity necessary to withstand the rigors of shipping, prolonged use and display by the proud recipient. The exterior paper surfaces provide the necessary material for printing and graphics to be cleanly transferred, such as the pre-printed, designed greeting and artwork on the card as purchased and any written message from the sender, should the sender be preparing the card himself or request assistance from another.

Figure 16:
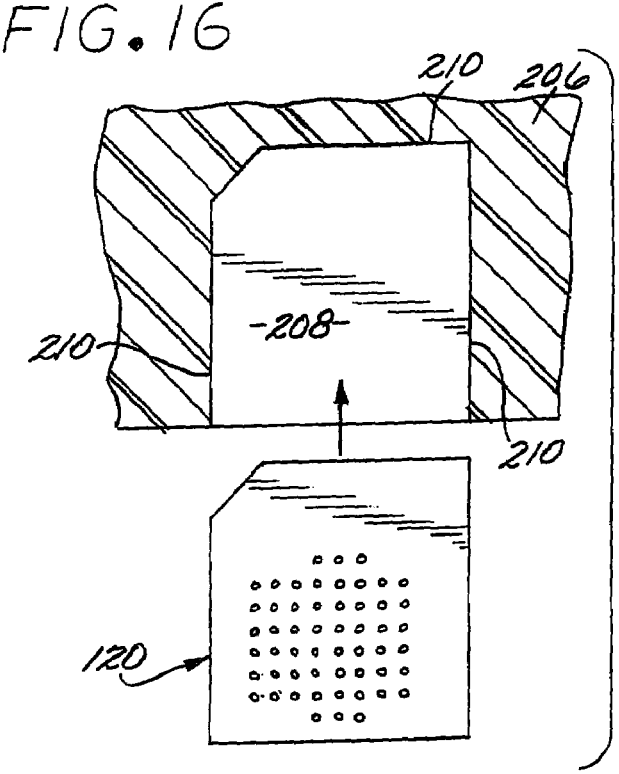
FIG. 16 is a sectional view, in enlarged scale and partially in section, taken along line 16-16 of FIG. 15.

Moreover, with reference now to FIG. 16, the construction of the back 202 also makes possible the formation of pocket 208 by pre-forming or cutting out a perimeter 210 in the core 206 so that when the paper stock is bonded to the core the pocket is formed. Furthermore, the pocket's perimeter is configured to match the profile of the voice module casing 150 (FIGS. 7 & 8), including the diagonal wall 160. In this way, the voice module 120 can only be fully inserted one way, insuring that the voice module is properly positioned within the card 200 and that the manual actuator 146 (FIG. 6) of the voice module will be adjacent to a corresponding marked area 212 on the card indicating where the recipient is to push or squeeze to initiate playback of the message. The card may also contain perforations or holes located adjacent the voice module's speaker 130 (FIG. 6) and hole pattern 154 (FIG. 7) to aid in the clear and audible playback of the voice message, further necessitating the proper orientation of the voice module within the greeting card. Finally, the card may be provided with a peel-off adhesive backing as is known in the art to facilitate attachment of the card to another item such as a gift, promotional product or business card. The voice module is retained within the pocket using tape, two-sided adhesive, friction or other closure means known in the art.

Figure 17:
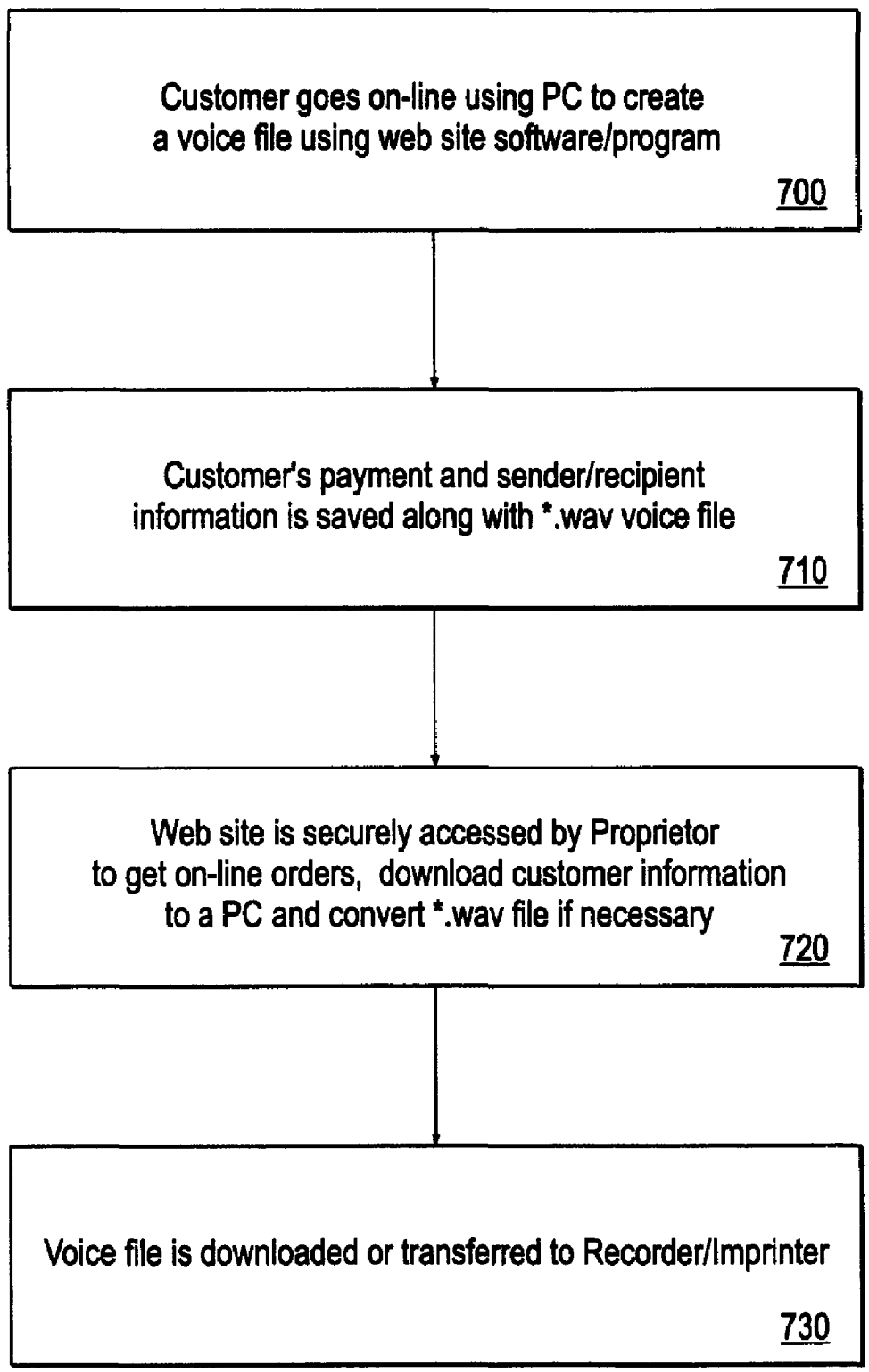
FIG. 17 is a flow diagram for the invention using a web page to facilitate creation of an audio voice file for incorporation into a voice module.

FIG. 17 illustrates another embodiment of the present invention using a step diagram. Here, a customer can use a personal computer with a microphone to create a voice message. The customer accesses the designated web site controlled and operated by a proprietor, which may also include proprietary software that allows a customer to create an electronic file storing a voice recording. The software may be downloaded onto the customer's PC, and using a microphone the customer creates a greeting including any personalized message. The software allows the web site to store the message on a server associated with the web site for retrieval by the proprietor. The web page would also extract personal information from the customer, including a name, address, billing information, shipping information, and other relevant information necessary to complete the transaction. This customer information is stored on the server along with the voice recording for later retrieval. The proprietor can then access the server associated with the web site using a non-public access to collect various orders, including the voice recordings and customer information. Preferably, the customer information would first be authenticated including verification of the billing information such as credit card authority. Once the customer information is established as acceptable, the voice recording is accessed and processed. A conversion of the voice message file may be necessary, such as a conversion from a .wav file or other audio file to a specialized file used by the recorder-imprinter device. This can be done after the authentication of the customer information and prior to transfer to the recorder-imprinter device, which may be located remotely from the proprietor. For example, the proprietor of the web site may have agreements with card shops, florists, and gift shops that each include a recorder-imprinter on the premises. If the customer is ordering flowers and wishes an audio message to accompany the flowers, the proprietor forwards the file (converted if necessary) to the florist along with the shipping information, who then creates a voice module containing the recorded voice message and incorporates the voice module with the flowers to be delivered to the recipient. Alternately, if the customer wishes a greeting card be sent to the recipient, the proprietor sends the voice message to a card shop who can create the necessary voice module for inclusion with the appropriate greeting card.

In an alternate embodiment, the web site of the proprietor is equipped with voice synthesizing software that can convert textual messages to synthesized voice messages. Here, a microphone is not needed for the customer to send an audio message because a computer generated voice "speaks" the customer's message, which is then saved for retrieval by the proprietor and incorporated into an intended delivery. The web site can still be accessed by either a cellular telephone, personal computer, or other computing device such as a PDA. Here, the voice synthesizing software would allow a customer to preview the audio message first before an order is completed, and would also permit a customer to retry a message that was not to the customer's preference. Further, alternate voice tones can be selected by the customer, such as a man, women, or child's synthesized voice. Once the customer has approved the voice message, it is stored on the server as with the previous example with the customer information for later retrieval and processing by the proprietor.

It will be appreciated by those skilled in the art that since the voice module is small and is a completely self-contained audio playback device, it can accompany a virtually unlimited number of cards, gifts, products and other packages. The versatility thus accorded the use of the voice module makes the audio message system of the present invention optimally configured for a wide variety of applications, even on a small budget.

Various modifications and changes may be made with regard to the foregoing detailed on without departing from the spirit of the invention.

I claim:

1. A method for incorporating a recorded voice message with an accompanying delivery comprising:
    establishing an internet web site configured for taking and storing consumer information, said consumer information including customer billing data;
    providing software on said web site accessible by a customer via a personal computer for creating voice message to be delivered to a recipient;
    storing said voice message along with said consumer information on a server hosting said web site;
    accessing said voice message and consumer information remotely, and authenticating said customer billing data;
    transferring said voice message to a recorder-imprinter device after authenticating said customer billing data for storing said voice message on a transferable voice module; and
    incorporating said transferable voice module into said accompanying delivery for forwarding to said recipient.

2. The method for incorporating a recorded voice message of claim 1 further comprising converting said voice message stored on said server from a first format compatible with said software to a second format compatible with said recorder-imprinter device.

3. The method for incorporating a recorded voice message of claim 1 wherein said accompanying delivery is a greeting card.

4. The method for incorporating a recorded voice message of claim 1, where the accessing of said voice message and authenticating of said customer billing data occurs at a location remote from the recorder-imprinter device.

5. A method for incorporating a recorded voice message with an accompanying delivery comprising:
    establishing an internet web site configured for taking and storing consumer information, said consumer information including customer billing data;
    providing software on said web site for reading a text message forwarded by a customer via a personal computer and creating a synthesized voice message from the forwarded text to be delivered to a recipient;
    storing said synthesized voice message along with said consumer information on a server hosting said web site;
    accessing said synthesized voice message and consumer information remotely, and authenticating said customer billing data;
    transferring said synthesized voice message to a recorder-imprinter device after authenticating said customer billing data for storing said synthesized voice message on a transferable voice module; and
    incorporating said transferable voice module into said accompanying delivery for forwarding to said recipient.

6. The method for incorporating a recorded voice message of claim 5 further comprising converting said synthesized voice message stored on said server from a first format compatible with said software to a second format compatible with said recorder-imprinter device.

7. The method for incorporating a recorded voice message of claim 5 wherein said accompanying delivery is a greeting card.

8. The method for incorporating a recorded voice message of claim 5, where the accessing of said synthesized voice message and authenticating of said customer billing data occurs at a location remote from the recorder-imprinter device.

9. The method for incorporating a recorded voice message of claim 5 further including providing a selection by the customer of a synthesized voice type.

10. A system for incorporating a recorded voice message with an accompanying delivery comprising:
    an internet web site configured for extracting consumer information, said consumer information including customer billing data;
    software accessible from said web site for creating a voice recording of a customer accessing said web site using a personal computer;
    a server storing said voice recording and consumer information;
    a secure link established between a proprietor and said server for accessing said consumer information and said stored voice recording at a remote location; and
    a recorder-imprinter device for transferring said recorded voice message onto a transferable voice module for incorporation into said delivery to a recipient.

11. The system for incorporating a recorded voice message of claim 10 wherein said accompanying delivery is a greeting card.

12. The system for incorporating a recorded voice message of claim 10 further comprising software operable by said web site for synthesizing a voice message from a textual input from said customer, said synthesized voice message comprising said voice recording.

13. The system for incorporating a recorded voice message of claim 12 further comprising a voice synthesizing tone selection in said software for selecting among several different synthesized voice tones.

14. A system for incorporating a recorded voice message with an accompanying delivery comprising:
    means for providing an internet web site configured for extracting consumer information, said consumer information including customer billing data;
    software means accessible from said web site for creating a voice recording of a customer accessing said web site using a personal computer or a cellular telephone;
    means associated with said web site for storing said voice recording and consumer information;
    a secure link established between a proprietor and said means for storing for accessing said consumer information and said stored voice recording at a remote location; and
    recorder-imprinter means for transferring said recorded voice message onto a transferable voice module for incorporation into said delivery to a recipient.

* * * * *